J. G. GILBERT.
Thrashing Machine.
No. 9,114.
Patented July 13, 1852.
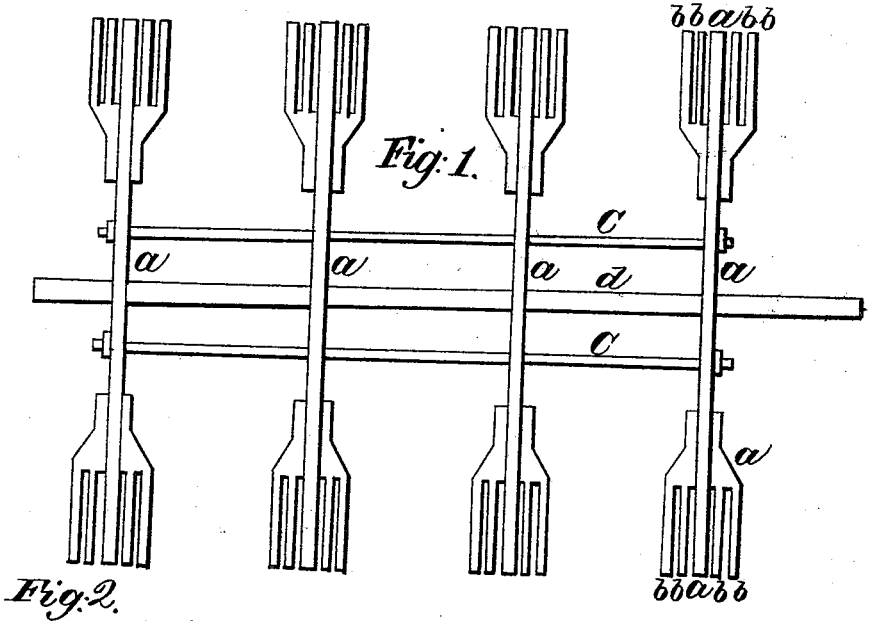
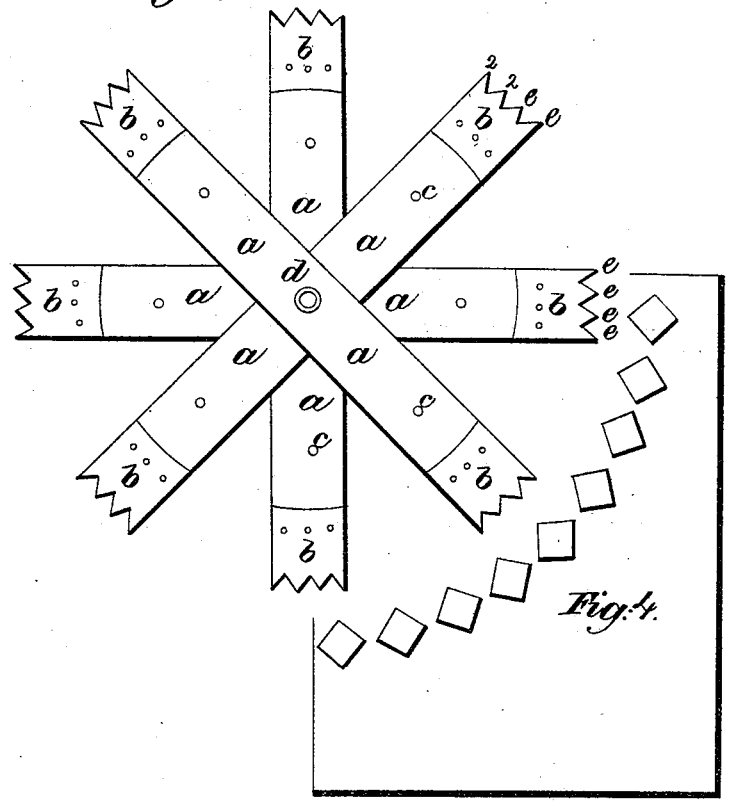
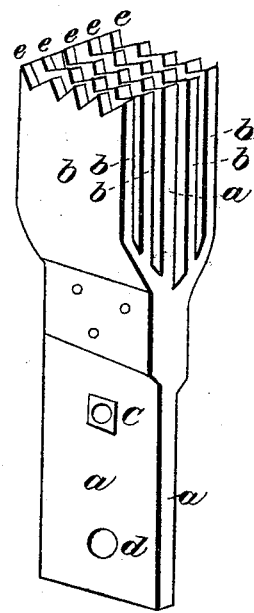

UNITED STATES PATENT OFFICE.

JOSEPH G. GILBERT, OF NEW YORK, N. Y.

THRESHING-MACHINE.

Specification of Letters Patent No. 9,114, dated July 13, 1852.

*To all whom it may concern:*

Be it known that I, JOSEPH G. GILBERT, of the city, county, and State of New York, have invented a new and useful Machine for the Purpose of Threshing Grain, called by the name of "Gilbert's Excelsior"; and I do hereby declare that the following is a full and exact description of the construction and operation of the same, reference being had to the annexed drawings, making a part of the specification, in which—

Figure 1, is a front view of four beaters placed on a shaft and bolted together; Fig. 2, is a side view of four beaters showing the manner in which they are usually placed on the shaft; Fig. 3, is a portion of a beater, showing the manner in which the plates of iron are fastened to the main bar, also more fully the teeth at the extremities of the beaters. Fig. 4, is a view of square iron bars over which the beaters revolve.

Letter *a*, is the main bar,—*b*, plates of iron attached to *a*. Letter *c*, rods or bolts passing through main bar *a*. Letter *d*, shaft running through center of main bar *a*. Letter *e*, teeth of beater.

To enable others to make and use my invention, I will describe its construction and operation.

The beaters Fig. 3, are formed of wrought iron. Take a bar of iron *a*, two and a half inches wide, one quarter of an inch thick, and fifteen inches long,—punch a hole through the center for the shaft *d*. Then take eight pieces of hoop or bar iron of the same width as *a*, one eighth to one quarter inch thick, of a length that when bent in shape as at letter *b*, will measure four inches, these plates are so bent and arranged, that when riveted to the main bar *a*, they present the appearance of a fine tined fork, the prongs being about one eighth of an inch apart. These plates *b*, can be welded or riveted to the main bar *a*, two on each side as in Fig. 3. Previous to attaching the plates punch the teeth *e*, in the ends of bar *a*, and plates *b*, also round off the ends of the bars *a*, and plates *b*, to correspond with a circle, of which the length of the bars *a* represent the diameter. The beater when completed should be perfectly true on the ends, all the points being on a line with each other. The beaters are then arranged on a steel or iron shaft *d*, in sets of two, crossing each other at right angles, as seen at Fig. 2,—in quantity—according to the length of the shaft, to which they are keyed, and to secure them more firmly are bolted as at letter *c*, in Fig. 1, which bolts pass through the bar *a* below the plates *b*, with washers between the beaters and secured at each end by nut and screw. These beaters when thus arranged, can be placed in frames and made to revolve over bars as in Fig. 4, or otherwise.

In the construction of this machine, I have overcome a difficulty, encountered in the ordinary threshing cylinders, which being solid, carries a great body of air, producing a current which obstructs the free passage of grain. This machine being open with the beater also open and so arranged on shafts that when revolving they cut or divide the air, thus preventing the difficulty afore mentioned pertaining to other cylinders; as well as increasing the power by diminishing the resistance to the atmosphere. I also carry off or prevent the dust (caused by the afore mentioned current) attendant on threshing being carried into the face and lungs of the operator. This form of beater revolving over bars as in Fig. 4 combs and beats the grain from the straw and does not break the straw as in ordinary threshers, thereby saving a vast amount of power.

Having thus fully described the nature of my invention, what I claim therein as new and desire to secure by Letters Patent, is—

The manner herein described of constructing skeleton threshing cylinders viz: by bolting or welding to the arms *a*, which are attached to the shaft *d*, any suitable number of branches *b*, which, together with the arms present their edges to the line of motion, and are provided with serrated ends, substantially in the manner, and for the purpose set forth.

JOSEPH G. GILBERT.

Witnesses:
R. A. HOLMES,
JAMES H. DOWNS.